(12) United States Patent
Correa Vasques et al.

(10) Patent No.: US 9,917,532 B2
(45) Date of Patent: Mar. 13, 2018

(54) GRID-TIED INVERTER, INVERTER ARRANGEMENT, AND METHOD FOR OPERATING AN INVERTER ARRANGEMENT

(71) Applicant: SMA SOLAR TECHNOLOGY AG, Niestetal (DE)

(72) Inventors: Pablo Ignacio Correa Vasques, Bad Neustadt an der Saale (DE); Florian Bethke, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/630,443

(22) Filed: Jun. 22, 2017

(65) Prior Publication Data
US 2017/0294852 A1 Oct. 12, 2017

Related U.S. Application Data (63) Continuation of application No. PCT/EP2015/079962, filed on Dec. 16, 2015.

(30) Foreign Application Priority Data
Dec. 23, 2014 (DE) .................. 10 2014 119 502

(51) Int. Cl.
*H02M 7/493* (2007.01)
*H02M 1/44* (2007.01)
(Continued)

(52) U.S. Cl.
CPC ............. *H02M 7/493* (2013.01); *H02J 3/383* (2013.01); *H02M 1/08* (2013.01); *H02M 1/44* (2013.01); *H02M 7/5395* (2013.01)

(58) Field of Classification Search
CPC ........ H02J 3/08; H02J 3/40; H02J 3/44; H02J 3/383; H02M 7/493; H02M 1/08; H02M 1/44; H02M 7/5395
See application file for complete search history.

(56) References Cited

U.S. PATENT DOCUMENTS 4,667,283 A * 5/1987 Seki .................. H02M 7/48
363/124
5,191,519 A * 3/1993 Kawakami ............... H02J 3/46
363/71
(Continued)

OTHER PUBLICATIONS

Cherus, Cheruiyot D. et al. Voltage Control in a Battery-Operated Sinusoidal Pulse-Width-Modulated (SPWM) Photovoltaic Inverter, 1999 IEEE. 6 pages.
(Continued)

*Primary Examiner* — Yusef Ahmed
(74) *Attorney, Agent, or Firm* — Eschweiler & Potashnik, LLC (57) ABSTRACT

A grid-tied inverter for supplying current to a power supply system includes an output bridge arrangement that is actuated via a pulse width modulator, wherein switching times of the output bridge arrangement are determined by using a periodic auxiliary signal, wherein the frequency of the periodic auxiliary signal varies according to a prescribed periodic wobble signal. The inverter further includes a synchronization unit configured to provide phase synchronization of the auxiliary signal to the power supply system, wherein the synchronization unit is configured to adjust a prescribed phase offset of the periodic auxiliary signal in relation to a phase of the power supply system, and a further synchronization unit configured to provide phase synchronization of the periodic wobble signal to the power supply system. The synchronization unit and the further synchronization unit each include a phase locked loop (PLL) circuit,
(Continued)

and the periodic wobble signal is routed to a controller system of the PLL circuit of the synchronization unit via a correction signal generator circuit and an adder circuit for the purpose of suppressing oscillations.

12 Claims, 4 Drawing Sheets

(51) Int. Cl.
  *H02J 3/38* (2006.01)
  *H02M 7/5395* (2006.01)
  *H02M 1/08* (2006.01)

(56) References Cited

U.S. PATENT DOCUMENTS

| | | | |
|---|---|---|---|
| 6,256,212 B1 | 7/2001 | Wobben | |
| 6,404,655 B1* | 6/2002 | Welches | H02M 7/4807 |
| | | | 363/17 |
| 9,401,662 B2* | 7/2016 | Bettenwort | H02J 3/383 |
| 9,559,614 B2 | 1/2017 | Eberhardt et al. | |
| 9,614,427 B2* | 4/2017 | Berger | H02M 1/00 |
| 9,680,364 B2* | 6/2017 | Khajehoddin | H02M 1/12 |
| 9,680,526 B2* | 6/2017 | Minamino | H04B 3/462 |
| 2005/0140330 A1 | 6/2005 | Throngnumchai | |
| 2006/0006741 A1* | 1/2006 | Tassitino, Jr. | H02J 9/062 |
| | | | 307/82 |
| 2006/0018229 A1* | 1/2006 | Senba | G11B 20/10009 |
| | | | 369/59.1 |
| 2006/0159210 A1* | 7/2006 | Kojima | G11B 20/1217 |
| | | | 375/354 |
| 2008/0205096 A1* | 8/2008 | Lai | H02J 3/38 |
| | | | 363/40 |
| 2008/0284252 A1* | 11/2008 | Jones | H02J 3/01 |
| | | | 307/82 |
| 2009/0185400 A1* | 7/2009 | Okui | H02M 7/493 |
| | | | 363/71 |
| 2010/0156192 A1 | 6/2010 | Wang et al. | |
| 2011/0103110 A1* | 5/2011 | Godridge | H02J 3/386 |
| | | | 363/74 |
| 2011/0130889 A1* | 6/2011 | Khajehoddin | H02J 3/383 |
| | | | 700/298 |
| 2012/0026769 A1* | 2/2012 | Schroeder | H02J 3/383 |
| | | | 363/131 |
| 2012/0063179 A1* | 3/2012 | Gong | H02M 1/12 |
| | | | 363/40 |
| 2012/0091817 A1* | 4/2012 | Seymour | H02J 3/383 |
| | | | 307/82 |
| 2014/0015326 A1* | 1/2014 | Eberhardt | H02J 3/383 |
| | | | 307/82 |
| 2015/0042092 A1* | 2/2015 | Nelson | H02J 3/386 |
| | | | 290/44 |
| 2016/0181809 A1* | 6/2016 | Chiang | |
| 2016/0226253 A1* | 8/2016 | Abido | H02J 3/383 |
| 2017/0047862 A1* | 2/2017 | Luo | H02J 3/38 |

OTHER PUBLICATIONS

International Search Report, dated Apr. 1, 2016, PCT/EP2015/079962.

* cited by examiner

GRID-TIED INVERTER, INVERTER ARRANGEMENT, AND METHOD FOR OPERATING AN INVERTER ARRANGEMENT

CROSS REFERENCE TO RELATED APPLICATIONS

This application claims priority to International Patent Application number PCT/EP2015/079962, filed on Dec. 16, 2015, which claims priority to German Patent Application number 10 2014 119 502.7, filed on Dec. 23, 2014, and is hereby incorporated by reference in its entirety.

FIELD

The disclosure relates to a grid-tied inverter for supplying current to a power supply system.

BACKGROUND

Grid-tied inverters are used in power supply installations, for example photovoltaic installations and wind energy installations. In the case of grid-tied inverters, a voltage or current characteristic that is output at the output of the inverter follows the corresponding characteristic in the power supply system. In the power supply installations, generators, for example photovoltaic modules in a series and/or parallel connection, produce a DC voltage that—possibly after a voltage change by a step-up converter—is supplied to a DC link circuit. Direct current from the DC link circuit is converted by the inverter into an alternating current whose frequency and voltage are suitable for supply to the power supply system. This conversion may be into single-phase or polyphase, particularly three-phase, alternating current in this case. For this, the inverter has an output bridge circuit that, depending on the number of phases of the power supply system that are intended to receive a supply, has one or more switching bridges that are usually equipped with power semiconductor switches.

The power semiconductor switches are in this case actuated according to a particular modulation pattern such that, in conjunction with filters that are arranged between the inverter and the power supply system, a preferably sinusoidal output current is produced. In the case of the pulse width modulation (PWM) methods that are frequently used, the power semiconductor switches are switched on and off at a switching frequency that is distinctly higher than the frequency of the AC voltage in a power supply system (for example a switching frequency of 3 to 30 kHz in comparison with a mains frequency of 50 or 60 Hz). Over the course of one period of the mains frequency, the ratio between switched-on time and switched-off time, called the duty ratio, is in this case altered within one switching frequency period such that a preferably sinusoidal characteristic of the output current is obtained. Known configurations for determining the duty ratios or the switching times are, by way of example, the "sine-delta modulation method", the "space vector modulation (SVM) method" or a modified sine-delta modulation method, e.g. what is known as "third harmonic injection sine-delta modulation method". In the case of these PWM methods, a periodic auxiliary signal or carrier signal, e.g. a triangular-wave form signal in the case of the "sine-delta modulation method", or a clock signal in the case of the "SVM method", is used for determining the switching times.

Even in the case of more complex modulation methods, however, the voltage produced at the output of the inverter bridges is typically not a pure sine signal, but rather exhibits e.g. frequency components at the switching frequency of the power semiconductor switches according to the modulation method.

To attain high powers, two or more inverters are frequently used in parallel, particularly in the case of larger photovoltaic installations, for example open air installations. When multiple inverters are operated in parallel, undesirable circulating or equalizing currents can arise on account of asynchronous switching times within the output bridge arrangements of the individual inverters. This occurs particularly when the periodic auxiliary signals that are used for determining the switching times of the output bridge arrangements of the individual inverters are highly phase-shifted with respect to one another. This results in asynchronous switching processes that can lead to brief voltage differences between the inverters, which in turn cause high-frequency equalizing currents. These equalizing currents can arise particularly when the inverters are not completely isolated from one another on the output voltage side. They are an undesirable additional current load for the affected electronic components, such as the AC filter capacitors, for example, which can have an adverse influence on the service life of these components.

The document US 2008/0265680 A1 describes an arrangement of multiple inverters that are directly coupled by their outputs. The inverters are controlled by PWM methods, with the auxiliary signals used therein being synchronized on the basis of a mains voltage. The effect achieved by this synchronization is that the power semiconductor switches of the coupled inverters are switched at the same times.

The document WO 2012/123559 A2 discloses a method that is suitable for inductively coupled, for example transformer-coupled, inverters. This method has provision for the auxiliary signals used for producing the actuating signals for the semiconductor power switches in the PWM method to be synchronized on the basis of the mains voltage, there being provision for a phase difference between the auxiliary signals of different inverters.

The document US 2010/0156192 A1 and the article "Voltage Control in a Battery-Operated Sinusoidal Pulse-Width-Modulated (SPWM) Photovoltaic Inverter", Africon, 1999 IEEE, Volume 2, pages 719-724, also describe PWM methods that involve an auxiliary signal used for actuating semiconductor power switches being synchronized on the basis of the mains voltage. The synchronization is attained using a PLL (Phase Locked Loop) circuit.

On the output side, inverters usually have provision for an AC voltage filter that shapes the output-side AC signal and particularly ensures that the output current characteristic is preferably sinusoidal. For this reason, the filter is frequently also referred to as a sine filter. Effective signal shaping is possible using what is known as an LCL filter, for example, which has two inductances connected in series in a phase line and which has a capacitor arranged between the center tap between the inductances and one of the further phases, a neutral conductor or center tap of the AC bridge of the output AC signal of the inverter. Such a filter is particularly effectively suitable for attenuating the switching frequency components of the bridge voltages. However, it is material-intensive and hence costly. It has been found that particularly the inductance of such an output current filter on the power supply system side can have its inductance value reduced, or may even disappear completely if need be, if, instead of a firmly prescribed frequency of the auxiliary signal for determining the switching times of the semiconductor power switches of the output bridge arrangement, a periodic auxiliary signal having a varying frequency is used for the inverter. The reason is that when an auxiliary signal having a varying frequency is used, as outlined above, the electromagnetic interference arising on account of the pulse-modulated bridge voltage extends over a broader frequency range and hence the respective amplitudes of the electromagnetic fields turn out to be distinctly lower for a specific frequency value. Stipulations made by power supply companies for the spectral intensity of a spurious signal can then also be met using smaller inductances in the output current filter, with particularly the output-side inductance, but sometimes also the input-side inductance, being able to be reduced. If need be, the inductance on the power supply system side can even be dispensed with completely.

To produce an auxiliary signal having a variable frequency, what is known as a wobble signal is usually used, the characteristic of which modulates the frequency of the auxiliary signal. The voltage characteristic used in this case is preferably a triangular-waveform characteristic.

An inverter using a PWM method with a variable pulse frequency is known from the document DE 197 48 479 C1, for example. In the case of this method, the pulse frequency is dependent on the characteristic of the alternating current produced, the pulse frequency being higher by a multiple at zero crossing of the alternating current than in the region of the maximum amplitude of the alternating current. This method minimizes switching losses for power semiconductor switches of the inverter and at the same time minimizes harmonics for the current characteristic of the alternating current produced.

Further purpose of an auxiliary signal having not a constant but rather a variable frequency is to allow a particularly prescribed and desired frequency of an auxiliary signal to be adjusted even when the frequency resolution of the signal generator that produces the auxiliary signal is not adequate for adjusting the desired frequency. In this case, it is possible to hop to and fro between two adjustable frequencies of a periodic auxiliary signal at a particular prescribed duty ratio such that the desired frequency is obtained at least on average. The aforementioned wobble signal for the auxiliary frequency is a square-wave signal in this case.

When two or more inverters that use a wobbled, i.e. varying-frequency, auxiliary voltage signal are interconnected, it is not possible to use the method outlined above for synchronizing the periodic auxiliary signals to the mains frequency. Hence, the known methods cannot be used to suppress the equalizing currents.

SUMMARY

The present disclosure provides an inverter or an arrangement of multiple such inverters and also a method for operation for an arrangement of multiple inverters in which, even in wobbled auxiliary voltage signals of varying frequency, equalizing currents between interconnected inverters are effectively prevented.

This disclosure comprises an inverter, an inverter arrangement and a method for operating an inverter arrangement.

An inventive grid-tied inverter of the type stated at the outset is distinguished in that a further synchronization unit is present that is set up for phase synchronization of the periodic wobble signal to the power supply system.

Thus, not only the periodic auxiliary signal itself, but also the wobble signal influencing the frequency of the periodic auxiliary signal is synchronized to the power supply system. This ensures that the periodic auxiliary signals of all inverters alter their frequency in the same way. For all inter-coupled inverters of an inverter arrangement, the power supply system is therefore used to ensure that the periodic auxiliary signal has the same frequency and the same phase. Hence, the semiconductor power switches of the output inverter bridges of all inverters are actuated in equal measure and hence equalizing currents between the inverters are prevented.

In one embodiment, the synchronization unit and the further synchronization unit each comprise a PLL (phase locked loop) circuit. In this way, it is a simple matter for both the auxiliary signal and the wobble signal to be synchronized to the power supply system, even though the auxiliary signal and the wobble signal usually have a frequency that is many times higher than that of the power supply system. In one embodiment, the PLL circuit respectively comprises a frequency converter having a conversion table and a D/A (digital/analog) converter, for converting the periodic auxiliary signal or the periodic wobble signal into a phase-locked sine voltage of lower frequency.

In addition, the periodic wobble signal is routed to a control system of the PLL circuit of the synchronization unit via a correction signal generator and an adder for the purpose of suppressing oscillations. In this way, it is possible to suppress oscillation tendencies when regulating the frequency of the auxiliary signal.

In one advantageous embodiment of the inverter, the pulse width modulator is a sine-delta modulator and a periodic auxiliary signal is a triangular-waveform signal.

In a further advantageous embodiment of the inverter, the periodic wobble signal is a triangular-waveform signal. The electromagnetic interference emitted by an inverter on account of the clocking of the semiconductor power switches is on a frequency that correlates with the frequency of the periodic auxiliary signal. When a triangular-waveform wobble signal is used for varying the frequency of the auxiliary signal, introduced electromagnetic interference is distributed over a broader frequency range. The respective amplitudes of the electromagnetic interference then turn out to be distinctly lower for a specific frequency value.

In a further advantageous embodiment of the inverter, the periodic wobble signal is a square-wave signal that adjusts the periodic auxiliary signal to two different frequencies. In one embodiment, the two frequencies differ by a frequency that corresponds to the minimally adjustable frequency difference of an auxiliary signal generator for the auxiliary signal. In one embodiment, the square-wave-shaped periodic wobble signal has a duty ratio at which, on average, a prescribed frequency situated between the two frequencies arises for the auxiliary signal. In this way, a frequency of the auxiliary signal can be adjusted for an inverter even if the frequency resolution of the generator for the periodic auxiliary signal does not permit adjustment of this desired frequency on account of an inadequate frequency resolution. Using this square-wave-shaped wobble signal, it is possible to hop to and fro between adjacent discrete and adjustable frequencies such that the auxiliary signal is generated at the desired frequency on average.

An inventive inverter arrangement having at least two grid-tied inverters that are coupled to one another on the AC side is distinguished in that the inverters are in the form as described above. The advantages cited in connection with the inverter are obtained.

Particularly advantageously, in one embodiment each inverter of such an inverter arrangement has a downstream output current filter on the AC side, wherein the output current filters are connected to one another by a respective output. In one embodiment, the output current filter is an LCL filter having a first inductance and a second inductance, wherein the second inductance has a lower inductance value than the first inductance. Alternatively, the output current filter may be embodied as an LC filter having only one inductance.

In a further advantageous embodiment of the inverter arrangement, the interconnected outputs of the output current filters are connected to a power supply system via a transformer.

If multiple PV installations having such inverter arrangements are provided for a photovoltaic power station, there may be provision for the inverters of a respective inverter arrangement to be synchronized with respect to the auxiliary and wobble signals as described above. The individual PV installations are, however, operated using prescribed, non-zero, relatively different phase offsets for their auxiliary signals. By way of example, when an even number of PV installations are interconnected with a mains access point of a power supply system, there may be provision for the PV installations each to be synchronized in pairs such that their respective discrepancies in the voltage characteristic from a sinusoidal characteristic are, in one embodiment, in phase opposition (phase shift of 180°) and they thus cancel one another out. With an uneven number of PV installations, these are, in one embodiment, operated with prescribed, non-zero phase offsets that are different and are distributed as evenly as possible over the entire phase space (0 to 2π or 0-360°).

A further aspect of the disclosure relates to a method for operating an inverter arrangement for supplying power to a power supply system having at least two inverters that are coupled to one another on the AC side. These at least two inverters each have an output bridge arrangement that is actuated in pulse width modulated fashion using a periodic auxiliary signal that is frequency modulated with a respective periodic wobble signal. The respective periodic auxiliary signal is phase synchronized to the power supply system. The method of operation is distinguished in that the periodic wobble signals of the two coupled inverters are phase synchronized to the power supply system and hence among one another. The periodic wobble signal is routed to a control system of a PLL circuit for synchronizing the periodic auxiliary signal via a correction signal generator and an adder for the purpose of suppressing oscillations. Again, the advantages cited in connection with the inverter are obtained.

BRIEF DESCRIPTION OF THE DRAWINGS

The disclosure is explained in more detail below using exemplary embodiments with reference to figures, in which.

DETAILED DESCRIPTION

The disclosure relates to a grid-tied inverter for supplying current to a power supply system, wherein the inverter has an output bridge arrangement that is actuated via a pulse width modulator. The switching times of the output bridge arrangement are determined by using a periodic auxiliary signal, wherein the frequency of the periodic auxiliary signal varies according to a prescribed periodic wobble signal. The inverter further comprises a synchronization unit for phase synchronization of the auxiliary signal to the power supply system, wherein the synchronization unit is configured to adjust a prescribed phase offset of the periodic auxiliary signal in relation to a phase of the power supply system. The disclosure additionally relates to an arrangement having at least two such inverters and to a method for operating such an inverter arrangement.

Figure 1:
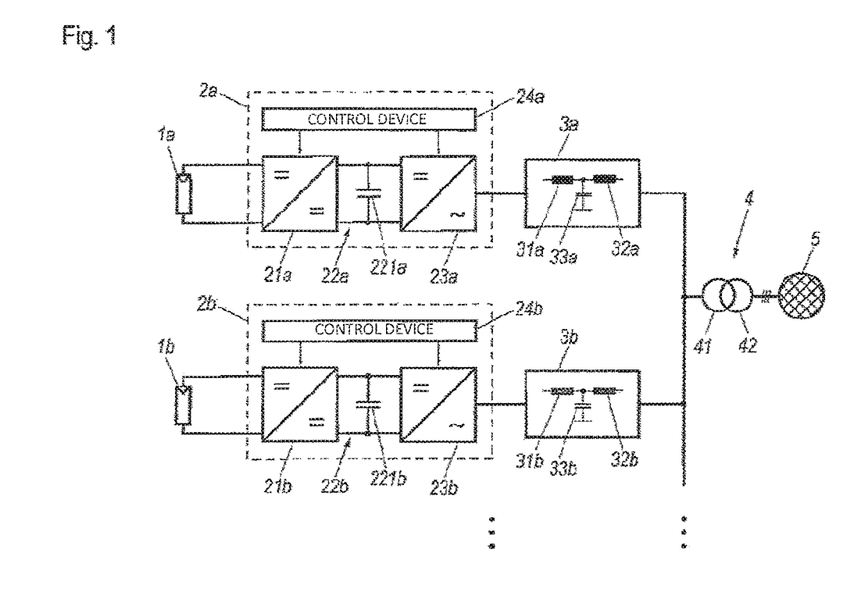
FIG. 1 shows a schematic block diagram of a power supply device having an inverter arrangement having two or more inverters.

FIG. 1 shows a photovoltaic installation as a power supply installation in a schematic block diagram. The photovoltaic installation, subsequently referred to as PV installation for short, has two photovoltaic generators (PV generators) 1a, 1b that are each connected to an inverter 2a, 2b. Each of the inverters 2a, 2b has a downstream output current filter 3a, 3b that is used for signal shaping for the output signal of the respective inverter 2a, 2b. The output current filter 3a, 3b forms, in one embodiment, a sinusoidal output current characteristic from a pulsed current signal. In the example embodiment depicted, each of the output current filters 3a, 3b has a series connection comprising a first inductance 31a or 31b and second inductance 32a or 32b, with a center tap between the inductances 31a, 32a and 31b, 32b being connected to a neutral potential via a capacitor 33a, 33b. Such an output current filter 3a, 3b is also referred to as an LCL filter on account of the components used.

On the output side, the output current filters 3a, 3b are interconnected, so that the inverters 2a, 2b are also coupled via the output current filters 3a, 3b.

The inverters 2a, 2b coupled to one another on the output side are connected to a power supply system 5 via a transformer 4. For this purpose, the transformer 4 has a primary winding 41 and a secondary winding 42. As indicated in the figure, more than the two inverters 2a, 2b depicted may also be coupled on the output side in the same way.

Symbolically, the PV generators 1a, 1b are each depicted in the figure only by the graphic symbol for a single photovoltaic cell. It is known that the PV generators 1a, 1b may, in an implementation of the depicted PV installation, each be constructed from a plurality of photovoltaic modules (PV modules) that are interconnected in series and/or in parallel. For reasons of clarity, further elements of PV installations, for example switching entities on the DC (direct current) side or on the AC (alternating current) side, for example installation isolators or fuse entities, are additionally not reproduced in the figure.

In the example embodiment depicted, the inverters 2a, 2b each comprise an input-side DC/DC converter 21a, 21b that are each connected to a DC/AC converter 23a, 23b via a link circuit 22a, 22b. It is noted that an inverter according to the application may also be configured without an input-side DC/DC converter. The DC link circuit has a respective capacitor 221a, 221b arranged in it that is used for smoothing a DC link circuit voltage Uz and allows pulsed current draw without voltage dips in the DC link circuit voltage Uz by the DC/AC converters 23a, 23b. The inverters 2a, 2b each have a control device 24a, 24b inter alia for controlling the DC/DC converters 21a, 21b and the DC/AC converters 23a, 23b. In this case, control of the DC/DC converters 21a, 21b can e.g. also comprise what is known as an MPP (maximum power point) tracking method that is used for operating the PV generators 1a, 1b at an operating point of maximum power.

The PV installation is configured to supply electrical power to the power supply system 5 on three phases. Accordingly, the inverters 2a, 2b in this example embodiment have a three phase output and the output current filters 3a and 3b and the transformer 4 are in a three phase configuration. To improve clarity, specific depiction of the individual phases has been dispensed within the figures. The aforementioned number of three phases is intended to be understood merely by way of example; an inverter according to the application and an inverter arrangement based thereon may likewise be suitable for operation with any number of phases, particularly single-phase operation.

In their DC/AC converters 23a, 23b, the inverters 2a, 2b comprise output bridge circuits comprising semiconductor power switches that are actuated using a PWM method. The output signal from the DC/AC converters 23a, 23b is therefore a clocked DC signal, with the clock frequency, that is to say the number of switching cycles per second, being able to be in the range from 1 kilohertz to over 100 kilohertz.

Figure 2:
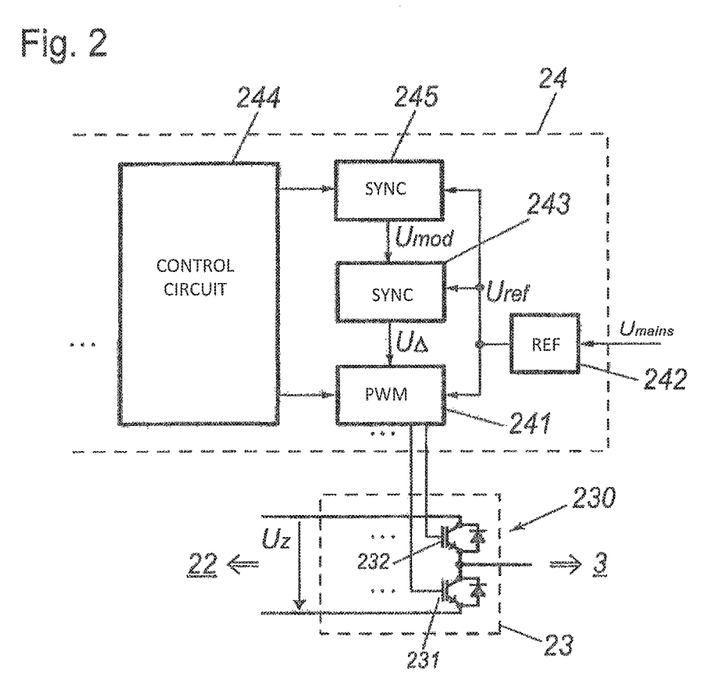
FIG. 2 shows part of an inverter in a schematic overview depiction in a schematic block diagram.

FIG. 2 shows a detailed segment of one of the inverters 2a, 2b from FIG. 1 likewise in a block diagram. The explanations that follow relate to both inverters 2a, 2b, which are of the same configuration in the example embodiment depicted in FIG. 1. There is therefore no distinction by the index a, b for the reference symbols.

The DC/AC converter 23 of the inverter 2 has an output bridge arrangement 230, for which one bridge section is depicted symbolically. In a three phase embodiment of the inverter 2, there are usually three of such bridge sections, which are indicated in the figure by ellipses. Other circuit topologies are by all means also conceivable, however.

In the embodiment depicted, each bridge section has two semiconductor power switches 231, 232. By way of example, IGBT (insulated gate bipolar transistor) switches are depicted, which are each provided with a protective diode connected in antiparallel. However, it is also possible for other suitable semiconductor switches, for example MOSFETs (metal oxide semiconductor field effect transistors) or SiC (silicon carbide) transistors, to be used. The switches 231, 232 are actuated by the control device 24. The control device 24 comprises a pulse width modulator 241, a reference voltage generator 242, a synchronization unit 243, a control unit 244 and a further synchronization unit 245.

The pulse width modulator 241 generates the actuating signals for the switching elements 231, 232 such that a characteristic of a reference voltage $U_{ref}$ prescribed for it, is reproduced. The reference voltage $U_{ref}$ is formed by the reference voltage generator 242 from a mains voltage characteristic, supplied to it, of the power supply system 5. Hence, the voltage characteristic that is output at the output of the inverter 2 follows that of the mains voltage; the inverter is grid-tied. The reference voltage generator 242 can provide the reference voltage $U_{ref}$ by mapping the voltage of one of the phases of the power supply system, subsequently called mains voltage $U_{mains}$, directly onto a lower voltage level of the reference voltage $U_{ref}$ or by also making use of the interposition of a reference voltage sine generator that is synchronized to the prescribed mains voltage $U_{mains}$ by means of a phase synchronization circuit (PLL—phase locked loop).

The frequency of the periodic auxiliary signal, that is to say in this case the triangular-waveform signal $U_A$ used, is transmitted to the synchronization unit 243 in this case by the further synchronization unit 245 in the form of a signal $U_{mod}$. In this case, according to the application, the signal $U_{mod}$ is not constant, but rather varies over time. It is subsequently also referred to as wobble signal $U_{mod}$. The wobble signal $U_{mod}$ may, by way of example, be a triangular-waveform or sawtooth-waveform signal if the frequency of the periodic auxiliary signal is varied linearly and possibly continuously within certain limits. The wobble signal $U_{mod}$ may also be a square-wave signal if there is provision for a change between two discrete frequencies of the periodic auxiliary signal.

To operate an inverter arrangement, a phase between the periodic auxiliary signal, in this case the triangular-waveform signal $U_A$, and the mains voltage $U_{mains}$, represented by the reference voltage $U_{ref}$ is adjusted for each inverter of the inverter arrangement such that the auxiliary signals of two coupled inverters are in phase with one another. For this purpose, the synchronization unit 243 is supplied with the reference voltage $U_{ref}$.

According to the application, there is further provision for the wobble signal $U_{mod}$ also to be synchronized to the mains voltage $U_{mains}$. For this purpose, the further synchronization unit 245 is also supplied with the reference voltage $U_{ref}$.

Figure 3:
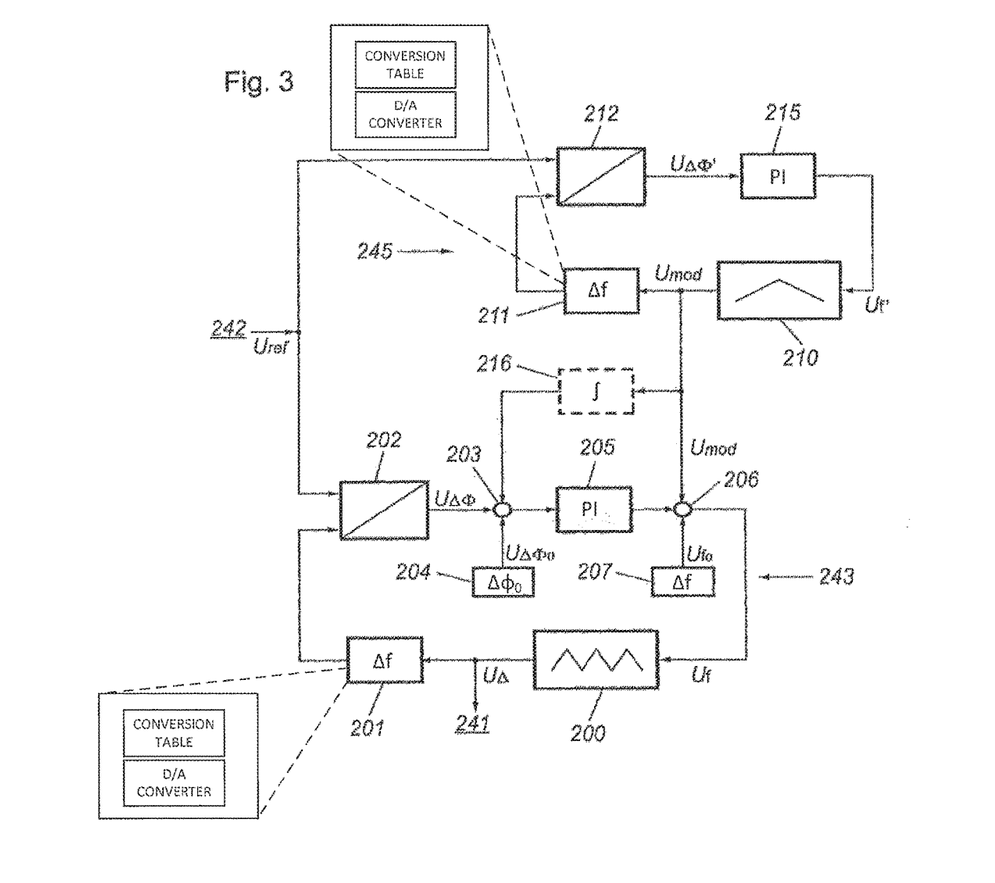
FIG. 3 shows synchronization devices usable for the inverter depicted in FIG. 2 for the auxiliary signal and the wobble signal in a more detailed schematic block diagram.

FIG. 3 shows the configuration of the synchronization unit 243 and of the further synchronization unit 245 from FIG. 2 in more detail in a block diagram. To start with, it is pointed out that FIG. 3 depicts a synchronization unit having analog control loops for the phase of the auxiliary signal for the PWM or of the wobble signal. It goes without saying that the synchronization units may likewise have a digitally operating controller.

The synchronization unit 243 has a triangular-waveform voltage generator 200 that is embodied as a voltage-controlled frequency generator, the frequency f of which is controlled by means of an input voltage signal $U_f$. The voltage signal that is output by the triangular-waveform voltage generator 200 at an output is provided to the pulse width modulator 241 as a triangular-waveform signal $U_A$.

Within the synchronization unit 243, the triangular-waveform signal $U_A$ is supplied to a frequency converter 201. The frequency f of the triangular-waveform signal $U_A$ is usually an integer multiple of the mains frequency $f_0$ of the power supply system 5. The frequency ratio $f/f_0$ between the two frequencies is in the range from approximately 10 to 1000 for currently used methods. To perform a comparison of the phases of the triangular-waveform signal $U_A$ and the lower-frequency mains voltage characteristic, the frequency converter 201 performs frequency division for the triangular-waveform signal $U_A$ by the cited factor, and also waveform conversion into a sinusoidal signal. One possibility for the conversion is to set up a rotary counter whose counter content is incremented by the value 1 per period of the triangular-waveform signal $U_A$ that is passed through. When the counter reaches a count that corresponds to the frequency ratio $f/f_0$, the counter is reset to an initial value of 1. The counter thus cyclically passes through $f/f_0$ different values, each cyclic pass corresponding to a period duration of the sine signal of the mains voltage $U_{mains}$. The frequency converter 201 stores a conversion table that stores, for each count, a corresponding value of a sine voltage with the period duration of the mains frequency $f_0$. At the output of the frequency converter 201, a voltage signal produced by means of a digital/analog converter is output according to the values of this table. The frequency converter 201 therefore provides a sinusoidal voltage signal at its output, which voltage signal is coupled in phase-locked fashion to the triangular-waveform signal $U_A$ of the triangular-waveform generator 200 and has a frequency that corresponds to that of the mains voltage $U_{mains}$. This signal is likewise supplied to a phase comparator 202, like the reference signal $U_{ref}$ provided by the reference voltage generator 242 (cf. also FIG. 2), which reference signal is phase-locked to the mains voltage. At the output of the phase comparator 202, a signal $U_{\Delta\phi}$ is output that is proportional to the phase difference of the two input signals.

In an adder 203, this signal also has a voltage added to it that is produced by an optional offset adjuster 204 and that corresponds to a phase offset $\Delta\phi_0$ to be adjusted, which, in one embodiment, is zero in the case of DC coupled inverters. However, there may also be provision for a phase offset $\Delta\phi_0$ not equal to zero, for example in order to allow for differences in the values of different output current filters 3a, 3b and phase shifts, brought about by the latter, in the output currents of different inverters 2a, 2b. The summed signal is supplied as a control variable to a closed-loop control module chip 205, which may be embodied as a proportional/integral controller (PI controller), for example.

The output of the closed-loop control module 205 is added in a further adder 206 to a fundamental frequency voltage $U_{f0}$, which is output by a fundamental frequency adjuster 207, and to the wobble signal $U_{mod}$, in order to produce the control voltage $U_f$, which, as described previously, controls the triangular-waveform generator (i.e., the auxiliary signal generator circuit) 200 and hence the frequency f of the triangular-waveform auxiliary signal $U_\Delta$.

The synchronization unit 243 thus comprises a phase locked loop (PLL) that continually corrects the frequency f of the triangular-waveform generator 200 via the closed-loop control module 205 such that a fixed phase relationship prevails between the triangular-waveform signal $U_\Delta$ and the reference voltage $U_{ref}$. In this case, this phase relationship can be adjusted via the offset adjuster 204 or else prescribed by a control device. The frequency ratio $f/f_0$ between the triangular-waveform signal $U_\Delta$ and the mains voltage $U_{mains}$ is determined via the frequency divider 201 and the conversion table stored therein.

In a comparable manner, the wobble signal $U_{mod}$ also has its phase matched to the mains voltage $U_{mains}$, represented by the reference voltage $U_{ref}$, by the further synchronization unit 245. For this purpose, the further synchronization unit 245 comprises a triangular-waveform voltage generator 210 for the wobble signal $U_{mod}$, which is embodied as a voltage-controlled frequency generator whose frequency f' is controlled via an input voltage signal $U_{f'}$. The frequency of the wobble signal $U_{mod}$ is typically lower than the frequency of the auxiliary signal $U_\Delta$, but is higher than the mains frequency.

Within the further synchronization unit 245, the triangular-waveform wobble signal $U_{mod}$ is supplied to a frequency converter 211. To perform a comparison of the phases of the wobble signal $U_{mod}$ and the lower-frequency mains voltage characteristic, represented by the reference voltage $U_{ref}$, the frequency converter 211 performs frequency division for the triangular-waveform signal $U_{mod}$ by a suitable factor, and wave conversion into a sinusoidal signal. Again, as described in connection with the synchronization unit 243 for the auxiliary signal $U_\Delta$, conversion can be performed using a rotary counter and a conversion table that stores a corresponding value of a sine voltage for each count. The sinusoidal signal that is output by frequency divider 211 is compared with the reference voltage signal $U_{ref}$ in a phase comparator 212. The output of the phase comparator 212 outputs a signal $U_{\Delta\phi'}$ that is proportional to the phase difference by the two input signals. This phase difference is supplied to a closed-loop control module or circuit 215, which may again by embodied as a proportional/integral controller (PI controller), for example. The closed-loop control module 215 uses its output to output the input signal $U_{f'}$ for the triangular-waveform voltage generator 210 in order to produce the wobble signal $U_{mod}$.

Optionally, to suppress oscillation tendencies for the control of the frequency f of the triangular-waveform signal $U_\Delta$, a correction signal generator 216 may be provided that takes the wobble signal $U_{mod}$ and produces a correction signal that is supplied to the input of the closed-loop control module 205 via the adder 203. The control can thus be extended by a controlling component that attenuates oscillation tendencies, particularly in the case of frequency hopping. The correction signal generator 216 may comprise an integrator, for example.

In the case of the example depicted in FIG. 3, a triangular-waveform wobble signal $U_{mod}$ is used. The electromagnetic interference emitted by an inverter on account of the clocking of the semiconductor power switches is on a frequency that correlates with the frequency of the periodic auxiliary signal. When a triangular-waveform wobble signal is used for varying the frequency of the auxiliary signal, electromagnetic interference introduced is distributed over a broader frequency range. The respective amplitudes of the electromagnetic interference then turn out to be distinctly lower for a specific frequency value. When there are prescribed limit values for the amplitudes of the interference, use of a triangular-waveform wobble signal $U_{mod}$ can involve less complex filtering of the output signal from the inverter bridge taking place. In particular, in the case of the example embodiment in FIG. 1, the second inductance 32a, 32b of the output current filters 3a, 3b can have its inductance value reduced, and depending on legal or regulatory stipulations it may even be dispensed with completely in some cases. This results in lower use of materials, which means the costs, weight and installation space can be saved.

Figure 4:
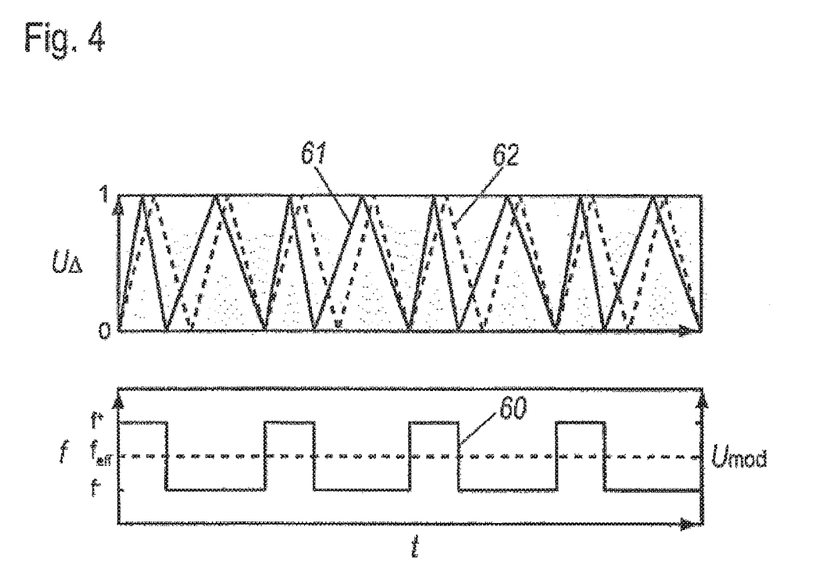
FIG. 4 shows time characteristics for a periodic auxiliary signal and a wobble signal in two graphs.

Another application for an auxiliary signal whose frequency varies over time is depicted in connection with FIG. 4.

The lower part of FIG. 4 uses the graph to show a time characteristic 60 for a square-wave modulation signal $U_{mod}$ (right y-axis of the graph over time t on the x-axis of the graph). With such a characteristic 60 of the modulation signal $U_{mod}$, the frequency of the auxiliary signal hops between two frequencies f⁻, f⁺, which are shown on the left y-axis of the graph.

The upper graph depicts the time characteristic 61 of the periodic auxiliary signal, which time characteristic results from the characteristic 60 of the modulation signal $U_{mod}$. The times for which the wobble signal $U_{mod}$ stays on one or the other value are in this case chosen such that the auxiliary signal respectively passes through a period at the higher frequency f⁺ and a period at the lower frequency f⁻ within the period duration of the wobble signal $U_{mod}$ in the example embodiment depicted. In alternative configurations, there may be provision for the higher frequency f⁺ and/or the lower frequency f⁻ to be respectively retained for multiple periods.

On average, the change between the frequencies f⁻ and f⁺ gives rise to a mean effective frequency $f_{eff}$, which is shown in the form of a dashed line in the lower part of FIG. 4. In the upper part of FIG. 4, a characteristic 62 of an auxiliary signal is likewise shown in dashes, the auxiliary signal being constantly at the frequency $f_{eff}$ in this case. A comparison of the time characteristics 61, 62 shows that on average the frequency of the modulated auxiliary signal corresponds to the effective frequency $f_{eff}$.

The method described can, by way of example, be used when the frequency resolution of the generator, e.g. the triangular-waveform generator 200 of FIG. 3, does not permit a desired effective frequency $f_{eff}$ to be adjusted for the periodic auxiliary signal. It is then possible, as depicted, to use the square-wave wobble signal $U_{mod}$ to hop to and fro between adjacent discrete and adjustable frequencies $f^-$ and $f^+$ such that on average the auxiliary signal is generated at the desired frequency $f_{eff}$.

The invention claimed is:

1. A grid-tied inverter for supplying current to a power supply system, comprising:
   an output bridge arrangement that is actuated via a pulse width modulator, wherein switching times of the output bridge arrangement are determined by using a periodic auxiliary signal, wherein a frequency of the periodic auxiliary signal varies according to a prescribed periodic wobble signal,
   a synchronization unit configured to provide phase synchronization of the periodic auxiliary signal to the power supply system, wherein the synchronization unit is configured to adjust a prescribed phase offset of the periodic auxiliary signal in relation to a phase of the power supply system, and
   a further synchronization unit configured to provide phase synchronization of the periodic wobble signal to the power supply system,
   wherein the synchronization unit and the further synchronization unit each comprise a phase locked loop (PLL) circuit, and
   wherein the periodic wobble signal is routed to a controller system of the PLL circuit of the synchronization unit via a correction signal generator circuit and an adder circuit for the purpose of suppressing oscillations.

2. The grid-tied inverter according to claim 1, wherein the pulse width modulator comprises a sine-delta modulator and the periodic auxiliary signal comprises a triangular-waveform signal.

3. The grid-tied inverter according to claim 1, wherein the PLL circuit respectively comprises a frequency converter circuit having a conversion table and a D/A converter, for converting the periodic auxiliary signal or the periodic wobble signal into a phase-locked sine voltage of lower frequency than the periodic auxiliary signal or the periodic wobble signal.

4. The grid-tied inverter according to claim 1, wherein the periodic wobble signal comprises a triangular-waveform signal.

5. The grid-tied inverter according to claim 1, wherein the periodic wobble signal comprises a square-wave signal that adjusts the periodic auxiliary signal to two different frequencies.

6. The grid-tied inverter according to claim 5, wherein the two frequencies differ by a frequency that corresponds to a minimally adjustable frequency difference of an auxiliary signal generator circuit for the periodic auxiliary signal.

7. The grid-tied inverter according to claim 6, wherein the square-wave-shaped periodic wobble signal has a duty ratio at which, on average, a prescribed frequency situated between the two frequencies arises for the periodic auxiliary signal.

8. An inverter arrangement having at least two grid-tied inverters that are coupled to one another on the AC side, wherein the grid-tied inverters each comprise the grid-tied inverter claimed in claim 1.

9. The inverter arrangement according to claim 8, wherein each grid-tied inverter comprises a downstream output current filter on the AC side thereof, wherein the output current filters are connected to one another by a respective output.

10. The inverter arrangement according to claim 9, wherein at least one of the output current filters comprises an LCL filter having a first inductance and a second inductance, wherein the second inductance has a lower inductance value than the first inductance.

11. The inverter arrangement according to claim 9, wherein the interconnected outputs of the output current filters are connected to the power supply system via a transformer.

12. A method for operating an inverter arrangement for supplying power to a power supply system comprising at least two inverters that are coupled to one another on an AC side, and that each of the at least two inverters comprises an output bridge arrangement that is actuated in pulse width modulated fashion using a respective periodic auxiliary signal that is frequency modulated with a respective periodic wobble signal, wherein the respective periodic auxiliary signal is phase synchronized to the power supply system, wherein the periodic wobble signals of the at least two coupled inverters are phase synchronized to the power supply system, wherein the respective periodic wobble signal is routed to a control system of a phase locked loop (PLL) circuit for synchronizing the respective periodic auxiliary signal via a correction signal generator circuit and an adder circuit for the purpose of suppressing oscillations.

* * * * *